Figure 1:
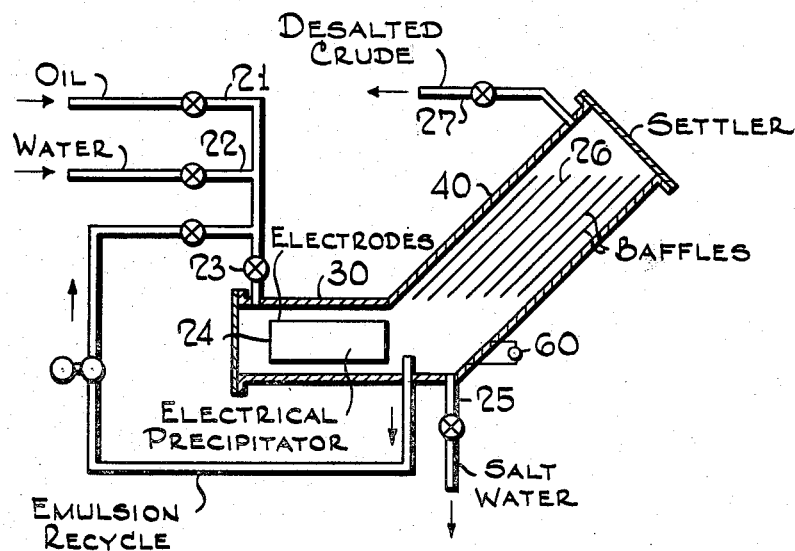

Jan. 19, 1954    J. W. PACKIE    2,666,739
ELECTRICAL COALESCENCE PROCESS
Filed April 28, 1949

John W. Packie  Inventor
By W. O. J. Heilman  Attorney

Patented Jan. 19, 1954

2,666,739

UNITED STATES PATENT OFFICE 2,666,739

ELECTRICAL COALESCENCE PROCESS

John W. Packie, Maplewood, N. J., assignor to Standard Oil Development Company, a corporation of Delaware Application April 28, 1949, Serial No. 90,136

2 Claims. (Cl. 204—190)

The present invention relates to an improved electrical coalescence process and apparatus therefor. It is more generally directed toward an improved method and apparatus for the breaking of emulsions, as for example aqueous emulsions. A particular adaptation of the present invention relates to an improved process and apparatus for treating hydrocarbon oils to remove foreign substances therefrom, as for example, for the removal of salt from fluid hydrocarbon streams containing the same. The invention is especially concerned with an improved method of electrical desalting wherein the flow of the fluid stream being desalted is controlled in a critical manner. In accordance with the present invention a hydrocarbon stream containing salt is chemically treated, emulsified and passed through a zone in which it is subjected to the effect of an electrical field for coagulation. The stream is subsequently passed to a settling zone.

It is well known in the art that various petroleum crudes contain salts and other deleterious substances in various concentrations. These salts comprise magnesium chloride, calcium chloride and sodium chloride. Among other metals present are iron, strontium, potassium and vanadium. Their salts may be present as the bromides, the sulfates, the carbonates and the bicarbonates. It is necessary that these salts be removed from crudes or at least reduced to a large extent since the salts not only cause corrosion of the refining equipment, but also plug equipment, as for example, heat exchangers, condensers and the like. While sodium chloride usually is present in the largest concentration, the magnesium chloride and the calcium chloride apparently cause the greatest amount of corrosion and damage of the refining and distillation equipment. It is, thus, known to remove these objectionable salts by various procedures.

One method employed is to add water to the crude containing these salts and to heat the mixture to a temperature of about 300° F. The heated stream is maintained at a pressure of about 200 lbs. In a desalting operation of this character in order to secure contact between the water and the salt in the crude, it is necessary to secure complete mixing of the water and the crude oil which results in the formation of an emulsion of the oil and water. The mixing is usually accomplished by passing the stream through a pressure reducing valve. The resulting emulsion is usually passed through a bed of coagulation material which generally comprises sand. The stream is passed to a settling zone wherein the water and oil segregate. The water phase containing the salt is withdrawn from the bottom of the settling zone while the oil phase which is usually substantially free of salt is removed from the top of the settling zone. The extent to which the oil is freed of salt is to a large degree a function of the size of the equipment and the amount of water employed. Usually, in order to secure a satisfactory lowering of the salt content of the oil it is necessary to employ relatively large equipment.

Other electrical processes have also been suggested. In general these processes comprise adding water to the salt-containing crude, heating the mixture to a temperature of about 200° F., at a pressure of about 75 lbs. and passing the stream through a pressure reducing valve to secure adequate mixing which results in emulsification. The emulsion is passed into a zone containing electrodes which maintain an electrical field between the same. Due to the electrical field, breaking of the emulsion results which permits the aqueous phase to segregate from the oil phase. The salt to a large extent associates itself with the water phase. While these processes have been satisfactory, it is necessary to employ relatively large equipment.

In accordance with the present invention it has now been discovered that providing the electrical desalting operation be operated in a manner to pass a stream first through a zone in which it is subjected to the electrical field and then through a settling zone.

Figure 2:
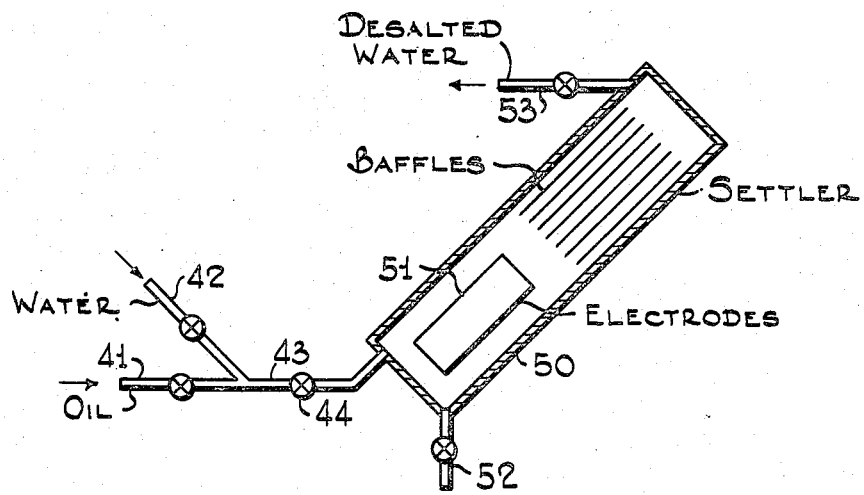

The present invention may be readily understood by reference to the drawings illustrating embodiments of the same. Figure 1 illustrates a preferred adaptation of the invention wherein the separation zone comprises an integral part of the desalting apparatus and is so positioned with respect to the electrical zone that the unbroken emulsion will tend to circulate back into the electrical zone. Figure 2 is a specific adaptation of the invention which is similar to the embodiment described with respect to Figure 1.

Referring specifically to Figure 1 an oil stream containing salt is introduced into the system by means of line 21. Water is introduced into the system by means of line 22. The mixture of oil and water may contain a suitable chemical reagent which aids the electrical removal of the salt from the oil. The mixture of oil and water is passed through pressure reducing valve 23. The oil is heated to a temperature of about 200° F. and maintained at a pressure of about 75 lbs. Due to the passage of the oil and water through valve 23 complete mixing of the water and oil is secured resulting in the formation of an emulsion. This emulsion is passed longitudinally through a high voltage electric coalescent section 30 between spaced electrodes 24. An electric potential is maintained between the electrodes. Aided by the electrical field the emulsion breaks into a water phase containing substantially all the salt and into an oil phase which is relatively free of salt. The water phase is withdrawn from zone 30 by means of line 25, while the oil phase together with some emulsion flows upwardly in zone 40 which is positioned at an angle between about 30 and 60° with respect to zone 30. Zone 40 contains disposed throughout baffle or settling elements 26. As the particles of emulsion break water collects on the baffles and flows downwardly whereas, the oil free of water and salt flows upwardly and is removed from zone 40 by means of line 27. The pump around emulsion recycle line illustrated may be employed to increase the residence time of the emulsion in the electrical coalescent zone. This is an optional feature which may be employed particularly when high throughput rates are desired.

In accordance with this adaptation of the invention the emulsion phase which does not break tends to inherently recycle in the system between the settling zone 40 and the electrical zone 30 wherein the emulsion is given further electrical treatment. Thus, particles of emulsion which are difficult to break are recycled for additional electrical treatment rather than permitted to remain in a vessel for a time which otherwise would be necessary to cause the breaking thereof. If this latter procedure be followed the size of the equipment would be extremely large as compared to the size of the equipment required in accordance with the present process. The height of the water layer is controlled by control means 60.

Referring specifically to Figure 2, an oil stream containing salt is introduced into the system by means of line 41. Water is introduced into the oil stream by means of line 42 and a chemical may be added by any means desired. The stream is heated to a temperature of about 200° F. in heating zone 43 and maintained at a pressure of about 75 lbs. per sq. in. The stream is passed through pressure reducing valve 44 wherein the pressure is sharply reduced to about 50 lbs. pressure. Due to the sharp pressure drop intimate mixing of the oil and water is secured resulting in the formation of an emulsion which is introduced into integral separating zone 50 consisting of a lower electrical section and an upper disposed distinct and separate settling section. The feed stream flows between a series of electrical anodes and cathodes 51 disposed in zone 50. Aided by the effect of the electrical field, breaking of the emulsion is secured resulting in the formation of a water phase containing the salt which is withdrawn from zone 50 by means of line 52. The oil phase together with emulsion passes without flow restriction into the upper section of zone 50 wherein coalescent elements as for example plates are dispersed throughout the area of the zone. The oil phase is withdrawn from zone 50 by means of line 53 while the emulsion which breaks releases particles of water on the respective coalescent surfaces, which particles of water flow backwardly along the surfaces and collect in the lower area of zone 50 and are withdrawn by means of line 52. Furthermore, in a manner similar to that described with respect to Figure 1, unbroken emulsion which reaches the separation zone and the coalescent surfaces tends to flow backwardly and above the water phase and thus is reintroduced into the electrical field between the electrodes. Thus, emulsion particles which are difficult to break are reintroduced into the electrical field. Thus, it is apparent that the mixture flowing from the electrical coalescent zone as illustrated by the diagrammatic Figures 1 and 2, will flow through the coalescent zone in a plurality of superimposed parallel substantially discrete streams.

Although the present invention has been described with its specific application to the desalting of a crude oil, it is broadly concerned with an improved electrical coalescence process and apparatus therefor. It may be adapted to the breaking of any emulsion, particularly aqueous emulsions. The invention is directed to a process wherein the feed stream is subjected to the effect of an electrical field and is then passed to a separation zone. In accordance with the present invention the unbroken emulsion is either retained or returned automatically to the zone wherein it is subjected to the effect of the electrical field. The particular pressures and temperatures employed in an operation are dependent upon the character of the stream being treated, as well as, upon the type and concentration of the dispersed substances present. As pointed out, the present invention is more specifically concerned with an electrical desalting operation wherein the electrical treating zone and the settling zone are separate and distinct sections. In accordance with the present invention the oil to be desalted is treated with water and preferably with a chemical reagent and emulsified. The chemical reagent may be any known de-emulsification material, as for example, sodium hydroxide and the like. The emulsion is passed through a zone wherein it is subjected to the effects of an electrical field. The electrical field may be secured also by any known procedure and arrangement of anodes and cathodes. The voltage also between the electrodes may be varied appreciably and may be in the range from 5,000 to 35,000 volts and higher. The respective phases flow from the electrical field and are passed to a settling zone. In accordance with the invention any unbroken emulsion inherently recycles itself to the electrical field section where it is resubjected to the effects of the electrical field.

The process involves emulsifying the feed stream which may comprise a crude oil or any refinery stream containing salt.

The mixture of water and oil which may contain added chemicals is passed through a mixing valve or other equivalent means. However, the preferred method of mixing is to pass the stream through a differential pressure control valve resulting in the formation of an emulsion. The emulsion in order to break the same is introduced into a horizontal, preferably a cylindrical vessel containing electrodes operating at relative high voltages. The emulsion flows horizontally between electrodes and is subjected to the effect of the electrical field and is thus broken. The phases leaving the electrical field flow to a settler zone which is preferably provided with closely spaced baffle elements in such a manner that any emulsion which is not completely broken is recirculated to within the electrical field.

In essence the process is conducted in two distinct stages which are specifically designed for distinct purposes. The electrical field stage is designed to efficiently subject the stream to the effects of the electrical field irrespective of settling requirements while the settling stage is designed to secure rapid and efficient settling irrespective of electrical field requirements. Furthermore, any unbroken emulsion is recycled to the zone of the electrical precipitator, giving, in effect, an internal recycling of emulsion to the precipitator.

The emulsification results from the extensive mixing of the respective phases which is necessary in order to secure the desired removal of the salt. As pointed out various de-emulsification agents may be used, as well as, agents for the adjustment of the pH value. One agent of the latter class is sodium hydroxide which is usually employed in a concentration which varies from about 0 to 15 lbs. of sodium hydroxide per thousand barrels of oil being desalted. The oil is usually heated to a temperature in the range from about 150° to 350° F. and maintained at a pressure in the range from about 25 lbs. to 200 lbs. per sq. inch. In accordance with the preferred adaptation of the present invention the oil is heated to a temperature in the range from about 175° F. to 225° F. and maintained at a pressure in the range from about 50 lbs. to 100 lbs. per sq. in. gauge. The mixing is secured by passing the heated stream under pressure through a pressure-reducing valve or equivalent means so as to reduce the pressure thereon to about atmospheric. Obviously, if the feed stream contains a sufficient quantity of water it may not be necessary to add additional water. A particularly desirable method of desalting a crude oil is to heat the same to a temperature of about 200° F. and to maintain the pressure on the stream at about 75 lbs. to 100 lbs. per sq. in. gauge. This stream is then passed through a pressure reducing valve wherein the pressure is reduced to about 35 to 75 lbs. per sq. in. gauge.

As pointed out heretofore, by operating in accordance with the present invention the time necessary for the emulsion to break is appreciably lowered, thus, requiring smaller equipment. The size of the equipment may vary appreciably depending upon various factors, such as feed rates, concentration of salt present in the feed oil and upon other characteristics of the feed. In accordance with the present invention it is very desirable that the settling zone contain longitudinally spaced baffle elements. These baffle elements should be parallel with respect to one another and may be spaced with respect to one another from 1" to 20" apart. However, it is preferred that the spacing be from about 2" to 3".

The invention may be further illustrated by the following example illustrating its embodiment with respect to the desalting of 50,000 barrels per day of crude. The crude contained approximately 1% to 3% of water and 250 lbs. of salt per thousand barrels of crude.

Example

In a conventional operation water was added to the crude to increase the water content to about 15% to 20% by volume. The mixture was heated to a temperature of about 200° F. and maintained at a pressure of about 75 lbs. per sq. in. gauge. The pressure was reduced to 50 lbs. on the crude securing mixing resulting in the formation of an emulsion. In a presently known electrical desalting unit the hold-up time necessary to secure the breaking of the emulsion satisfactorily is about 60 minutes.

In another operation conducted under identical conditions, except that the separation zone was maintained separate and distinct from the electrical field zone and wherein baffles are spaced on 18" centers, the hold-up time is about 10 minutes. Thus, it is apparent that equipment only one-sixth of the size is required in this case as compared to the size of the equipment required in the first operation given.

On the other hand, if the operation is conducted utilizing two distinct stages in accordance with the process of the present invention and wherein the baffles are spaced on about 2" centers the hold-up time necessary to secure the breaking of the emulsion is about 3 minutes. In this operation the electrical precipitator is about 5 ft. in diameter and 15 ft. long. The settler is about 5 ft. in diameter and about 20 ft. long. On the other hand, in the second operation wherein the baffles are spaced on 18" centers, the settler is about 7½ ft. in diameter and about 40 ft. long.

Having described the invention it is claimed:

1. Process for the removal of salt from a hydrocarbon which comprises adding water to said hydrocarbon, intimately mixing the added water and said hydrocarbon at an elevated temperature and pressure whereby emulsification of the hydrocarbon and added water results, introducing the mixture into an integral separation zone consisting of a high voltage electrical coalescent section and an immediately adjoining settling section, passing the mixture through said high voltage coalescent section, whereby the mixture is partially resolved, then passing the partially resolved mixture from said electrical section without flow restriction to said settling section and along a plurality of spaced parallel surfaces therein, segregating a plurality of superimposed parallel substantially discrete streams in said settling section, whereby a hydrocarbon phase and an aqueous phase forms in each of said discrete streams, recombining the hydrocarbon phases and withdrawing the combined hydrocarbon phases from the upper area of said separation zone, recombining the water phases and withdrawing the combined water phases from the bottom of said separation zone, said process being particularly characterized by internal recycling of the said mixture between sections.

2. The process defined by claim 1 in which said discrete streams are upwardly inclined with respect to the electrical coalescent section.

JOHN W. PACKIE.

References Cited in the file of this patent

UNITED STATES PATENTS

| Number | Name | Date |
|--------|------|------|
| 987,116 | Cottrell et al. | Mar. 21, 1911 |
| 1,405,129 | Harris | Jan. 31, 1922 |
| 1,838,922 | Fisher | Dec. 29, 1931 |
| 1,946,415 | Schmid | Feb. 6, 1934 |
| 1,980,722 | Garrison et al. | Nov. 13, 1934 |
| 2,182,145 | Eddy | Dec. 5, 1939 |